United States Patent [19]

Kindl

[11] 3,924,338
[45] Dec. 9, 1975

[54] ROTARY POSITIONING APPARATUS AND METHOD
[75] Inventor: George F. Kindl, Newington, Conn.
[73] Assignee: Colt Industries Operating Corporation, West Hartford, Conn.
[22] Filed: Apr. 24, 1974
[21] Appl. No.: 463,508

[52] U.S. Cl. ............... 33/174 TC; 33/1 D; 33/1 N; 74/815
[51] Int. Cl.² G01B 5/24; B23Q 17/02; B23Q 17/18
[58] Field of Search ..... 33/1 D, 1 N, 1 PT, 174 TD, 33/174 TC; 74/813 C, 815

[56] References Cited
UNITED STATES PATENTS

| | | | |
|---|---|---|---|
| 2,524,538 | 10/1950 | Pearson | 33/174 TC |
| 2,588,932 | 3/1952 | Klingenberg | 33/1 D |
| 2,916,950 | 12/1959 | Bullard | 74/815 |
| 3,075,411 | 1/1963 | Adise et al. | 74/815 |
| 3,228,266 | 1/1966 | Budney et al. | 33/174 TD |
| 3,280,658 | 10/1966 | Erickson | 33/1 PT |

Primary Examiner—Richard E. Aegerter
Assistant Examiner—Richard R. Stearns
Attorney, Agent, or Firm—Radford W. Luther; Richard A. Dornon

[57] ABSTRACT

A system for precisely setting or ascertaining the angular position of a rotating member has a quantizer for indicating a pluraity of discrete angular index positions of the rotating member and a peripheral measuring arrangement for accurately setting the angular position of the rotating member between adjacent index positions. The peripheral measuring arrangement includes an accurate micrometer headstock, having a precision measuring screw and dial, and a dial indicator with a spring loaded probe. The micrometer headstock is fixedly mounted upon the support for the rotating member such that the tip of the measuring screw is disposed near the periphery of the rotating member and the axis of the measuring screw is perpendicular to a radial line from the center of the rotating member at the tip of the measuring screw. The dial indicator is adapted to be fixedly positioned at any location whatever on the rotating member's periphery.

In order to position the rotating member between first and second adjacent index positions, the rotating member is moved until it assumes the first index position. The probe of the dial indicator is then brought into aligned engagement with the tip of the measuring screw, and subsequently, the dial indicator is fixedly attached to the rotating member with both the headstock dial and dial indicator reading zero. Next, the headstock dial is turned to displace the measuring screw by an amount corresponding to the desired angular increment between the index positions, which action causes the dial indicator to yield a reading other than zero. Finally, the rotating member is turned until the dial indicator again reads zero. The rotating member is now positioned at the desired angular position.

6 Claims, 9 Drawing Figures

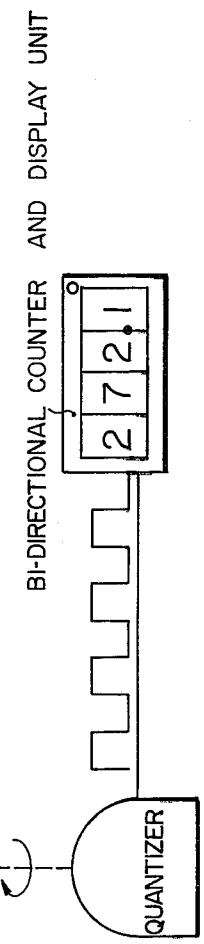

ROTARY POSITIONING APPARATUS AND METHOD

BACKGROUND OF THE INVENTION

This invention relates to apparatus and methods for accurately positioning rotating members.

The problem of accurately positioning a rotating member in a desired angular position is frequently encountered in the machine tool field, particularly with respect to rotary tables. Rotary precision encoders which are currently available, are capable of measuring angles to a resolution of about one second of arc. However, the cost of such sophisticated instruments represents a major capital expenditure which many in the field cannot afford. Although purely mechanical systems are available which yield high accuracy, such accuracy is impaired by wear. There is thus a need for a system of accurately positioning a rotating member which does not entail a prohibitive expenditure, and will not deteriorate with prolonged use.

SUMMARY OF THE INVENTION

In accordance with the invention, a rotary positioning apparatus is provided which may be constituted by relatively inexpensive state of the art devices and yet has the capability of measuring angles to an accuracy of about two seconds of arc. The invention offers a further advantage since existing rotating machinery may be easily converted in accordance therewith. Another salient feature of the invention is that the precision with which the rotating member is positioned is fully independent of wear in the drive mechanism thereof.

In a system of the invention, there is provided a rotating member having a quantizer connected thereto for indicating a plurality of discrete angular index positions. In addition a peripheral measuring arrangement is provided for accurately setting the angular position of the rotating member between adjacent index positions. The peripheral measuring arrangement comprises a precision screw assembly mounted upon a base which supports the rotating member. The tip or other reference location upon the precision screw assembly lies along a radial line drawn from the axis of rotation of the rotating member. Also included in the peripheral measuring arrangement is a displacement sensor adapted to be fixedly positioned at any location adjacent the rotating members periphery in engagement with the precision screw assembly. In a preferred form, the displacement sensor displays a reading indicating a movement of the precision screw assembly which reading may subsequently be annulled by a slight rotation of the rotating member to the desired angular increment between the index positions.

In essence the method of the invention includes positioning the rotating member in a discrete index position, advancing a precision screw assembly by an amount which corresponds to the desired incremental angular movement of the rotating member and either concurrently or subsequently turning the rotating member in such a manner as to restore the spacial relationship between a reference location on the precision screw assembly and the rotating tables periphery.

From the foregoing, it will be appreciated that the invention achieves accuracy in rotary positioning without incurring a substantial cost penalty. Also, rigid mechanical accuracies mandated by other systems are obviated. Furthermore, it should be evident that the accuracy of a system of the invention can be established in a facile manner.

It is therefore a primary object of the invention to provide a relatively inexpensive system for setting the angular position of a rotating member.

It is another object to provide a system for adjusting the angular position of a rotating member which includes a quantizer and a precision screw assembly.

It is a further object to provide an angular positioning system whose accuracy is not impaired by mechanical wear.

These and other objects and advantages of the invention will become more readily apparent from the following detailed description, when taken in conjunction with the accompanying drawings, in which:

BRIEF DESCRIPTION OF THE DRAWINGS

FIG. 2 is a schematic view of the relationship between the rotary table, the quantizer and the display unit of FIG. 1.

FIGS. 3a – 3g are successive schematic diagrams illlustrating the setting operation of the rotary table of FIG. 1, which is also an embodiment of a method of the invention.

DETAILED DESCRIPTION OF PREFERRED EMBODIMENT

Figure 1:
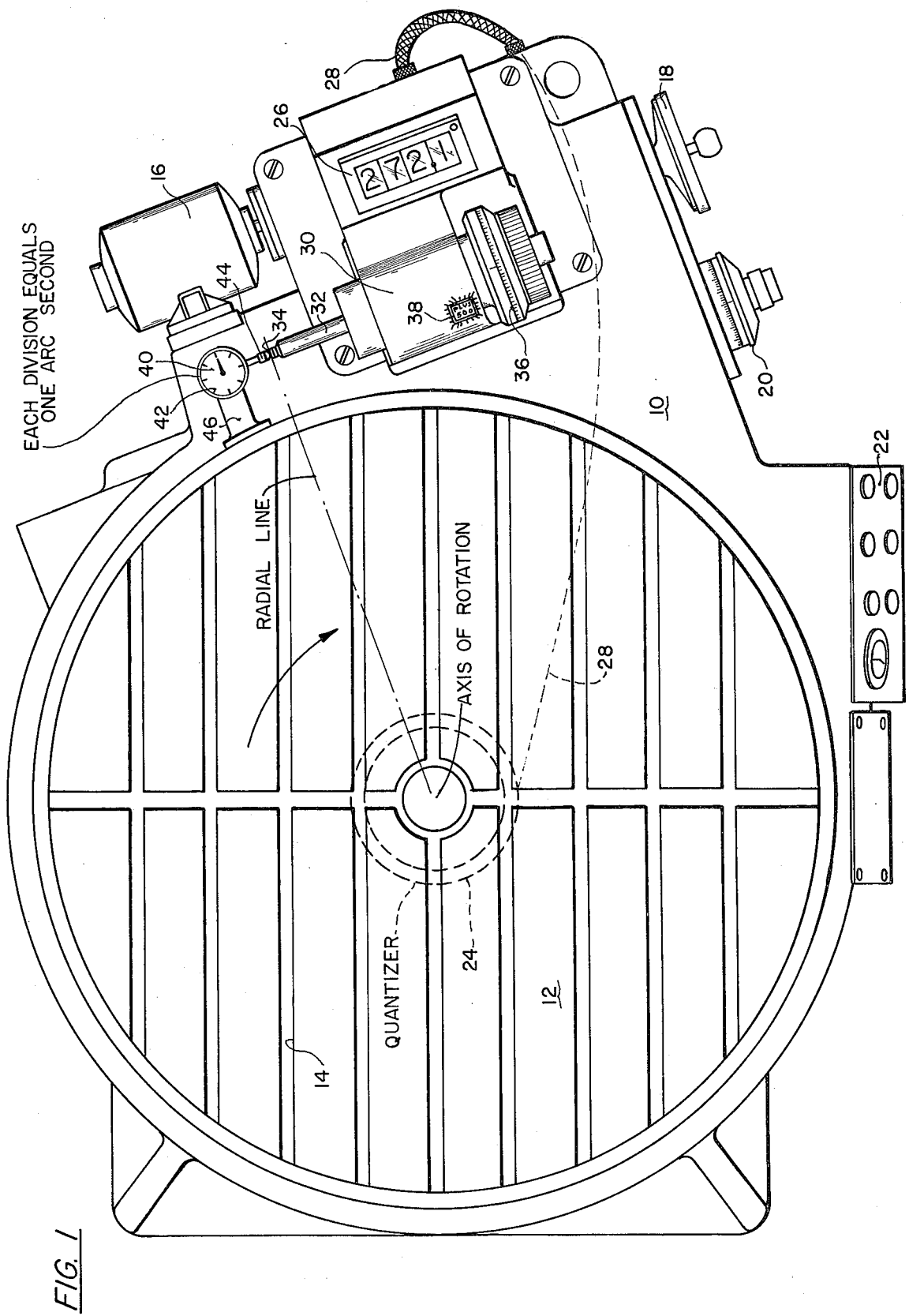
FIG. 1 is a top plan view of a rotary table incorporating a preferred embodiment of the invention.

Referring first to FIG. 1, there is shown a generally conventional rotary table device which when new is capable of being positioned to within fifteen seconds of arc. As shown in FIG. 1, this prior art rotary table has been modified in accordance with the invention by the incorporation of certain elements therein, which serve to substantially improve its original accuracy, as is explained hereinafter. It should be noted that although the invention will be described with reference to a prior art rotary table, its field of application may embrace the positioning of any rotating member. Hence, the following description is to be considered as illustrative and not as limiting the scope of the invention.

The rotating table device of FIG. 1 includes a support 10 upon which a rotating work support member 12 is rotatably mounted. The rotating member 12 is carefully machined to provide a perfectly planar surface upon which there are arranged a number of parallel T-slots 14. The slots 14 are adapted to accommodate T-bolts to assist in mounting the piece to be worked. The rotating member is driven about its axis of rotation by a motor 16 through suitable gearing and shafting, which includes a worm gear on the rotating member 12 and a worm mounted in the support 10. The rotating member also may be manually rotated, when desired, by means of a hand wheel 18. The vernier dial 20 permits further calibration of the rotary table device. To the left of the hand wheel 18, an operator control panel 22 is located.

To the under side of the rotating member 12 is operatively connected a state of the art quantizer 24 which is mounted upon the support 10. The quantizer 24 includes an illuminated grating disc (not shown) employing 3,600 index marks, each of which represents a tenth of a degree. When the rotating member 12 is rotated the quantizer 24 emits a square wave signal (FIG. 2) which is communicated to a bidirectional counter and display unit 26 via a connecting cable 28. Depending upon the sense of rotation of member 12, the counter and display unit 26 is either incremented or decremented.

As shown in FIG. 1, the angular position of the rotating member 12 is depicted to a tenth of a degree. Since the bidirectional counter and display unit 26 is decremented or incremented at the leading edge of a pulse, the angular position of the rotating member at the point where the bidirectional counter and display unit 26 under goes either incrementation or decrementation is the indicated reading, with a possible error of about one second of arc. By merely adjusting the vernier 20 so as to increment or decrement the unit 26, a precise angular positioning of the rotating member 12 is effectuated. Hence, it will be appreciated that the quantizer 24 allows the rotating member 12 to be positioned, with about one second of arc accuracy, in 3,600 discrete index positions.

The remaining portion of this description is concerned with describing the manner and means by which the rotating member 12 may be accurately positioned between two adjacent index positions.

A precision screw assembly in the form of a headstock 30 of an accurate micrometer is fixedly mounted upon the support 10 beyond the periphery of the rotating member 12. The headstock 30 incorporates a spindle 32 having a reference location constituted by its tip 34 and a dial 36 connected thereto for imparting rotation. The dial 36 has 500 graduations, which each represent one ten thousandths of a degree. Obviously, two 360° rotations of the dial 36 will axially displace the spindle by an amount which corresponds to one tenth of a degree. A window 38 illuminates during the second revolution of the dial 36, to apprise an operator of the fact that 500 ten thousandths must be added to the dial setting to obtain the true setting. If desired a digital readout could be utilized to replace the graduations. For a two foot diameter rotating member, it is interesting to note that the maximum displacement of the spindle 32 should be about two hundredths of an inch. Also, the best accuracy can be achieved when the reference location 34 lies along a radial line (FIG. 1) drawn from the axis of rotation when the dial has been rotated one revolution, it should also be evident that the spindle is so orientated that its axis is perpendicular to this radial line.

Considering the radial line as being fixed with respect to the rotating member 12, the problem is how to rotate the member 12 from a discrete index position to the angular incremental position as set by the spindle 32, or in other words to restore the relative position of the radial line, and hence the rotating member 12, with respect to the reference location 34 of the spindle 12. To this end, a displacement sensor 40 (shown in the form of a dial indicator) is provided to register change in the relative positions of the radial line and the reference location 34 when the spindle 32 is displaced by a setting of the dial 36. The sensor 40 comprises an indicating dial 42, calibrated in seconds of arc and the usual spring loaded probe 44. A bracket 46, connected to the dial 42 is adapted to be fixedly secured to or quickly released from the rotating member's periphery at any location whatsoever. Normally, when the member 12 is being turned by the motor 16, the sensor 40 is not attached to the member's 12 periphery.

After the rotating member is positioned in the desired index position, the sensor 40 is fixedly attached to the rotating member's periphery with its probe 44 in engagement and axial alignment with the spindle 32.

The dial 42 is adjusted by means (not shown) so that it indicates a reading of zero. The dial 36 of the precision screw assembly 30 was previously adjusted to yield a zero reading. The dial 36 is now advanced from the zero reading to the desired angular incremental position which begets a reading different from zero on the dial 42. The vernier dial 20 is now advanced until the reading of dial 42 is again zero, which action serves to position the rotating member in the desired incremental angular position. It should be apparent that the position of the table with respect to the reference location has now been restored.

The particular form of the selected displacement sensor 40 admits of a number of variations. For example, it could be constituted by a photosensitive gage head as shown in U.S. Pat. No. 3,253,153. Also, a pivoting type sensor would also be appropriate. In addition, fluidic or electrical proximity sensors would also suffice. It should be mentioned at this point that a direct physical connection between the precision screw assembly and the rotating member whereby rotation of the dial 36 would turn the rotating member 12 is also within the ambit of the invention.

In order to more fully appreciate the invention, reference should be had to FIGS. 3a to 3g, wherein a specific example of operation is set forth. Initially, in FIG. 3a the rotating member 12 is at rest somewhere between the 272.1° and 272.2° index positions and it is desired to locate the member 12 0.0682° beyond the 317.4° index position, VIZ, : The angular position of 317.4682°.

The rotating member 12 is now rotated in a clockwise sense (FIG. 3b) until 371.4 just appears in unit 26, that is, rotation is terminated just as the reading of the last figure changes from a .3 to a .4. The displacement sensor 40 is then attached to the rotating member's periphery with its probe 44 in axial engagement with the spindle 32, as shown in FIG. 3c. At this point both the dial 42 and the dial 36 are yielding zero readings. To insure that the rotating member 12 has not been displaced, the position of member 12 is slightly adjusted such that .3 just appears as that last figure in unit 26 (FIG. 3d). The reading of sensor 40 should not vary by more than a second of arc from the zero setting of the pointer therein. Next, as illustrated in FIG. 3e, the rotating member is very slightly moved in the clockwise direction until .4 appears in the unit 26 as the last figure. Turning to FIG. 3f, the angular incremental position (0.0682°) of the rotating member 12 is now set on the dial 36, the light 38 being illuminated as explained hereinabove. Such action causes the sensor 40 to give a reading different from zero (off scale reading). Finally, as depicted in FIG. 3g, the rotating member is rotated in a clockwise sense until the displacement sensor 40 again yields a zero reading. The relative positions of the reference location 34 and the rotating member 12 have now been restored to those of FIG. 3e, and the rotating member has assumed the angular position of 317.4682°

Obviously many modifications and variations are possible in light of the above teachings without departing from the scope and spirit of the invention as defined in the appended claims.

I claim:

1. Apparatus for setting an angular position comprising:
   a support;
   a rotating member mounted for rotation upon the support;

a quantizer operatively connected to the rotating member for indicating a plurality of discrete angular index positions of the rotating member;

a precision screw assembly fixedly mounted upon the support;

a reference location on the precision screw assembly being displaceable by an amount which corresponds to the desired angular increment between two adjacent index positions;

a displacement sensor adapted to be fixedly connected to the rotating member to engage the precision screw assembly for sensing the displacements of the reference location.

2. Apparatus, as defined in claim 1, wherein the precision screw assembly comprises:

a spindle; and wherein the reference location is located on the spindle such that a radial line from the axis of rotation of the rotating member is perpendicular to the axis of the spindle.

3. Apparatus, as defined in claim 1, wherein the quantizer is adapted to generate pulses as the rotating member rotates and wherein there is further provided:

a bidirectional counter and display unit to receive the pulses for incrementation and decrementation.

4. A method of positioning a rotating member about its axis of rotation comprising:

positioning the rotating member in a discrete angular index position;

displacing a reference location, which lies along a radial line from the axis of rotation and is remote from the rotating member, by an amount which corresponds to the desired angular incremental position in a direction perpendicular to the radial line; and restoring the rotating member to its position with respect to the reference location which it had assumed in the index position.

5. The method of claim 4, wherein the positioning of the rotating member in the index position comprises: generating and counting pulses.

6. Apparatus for setting an angular position comprising;

a support;

a rotating member mounted for rotation upon the support;

means for indicating a plurality of discrete angular index positions of the rotating member;

means for providing a fixed reference location on the support which lies along a radial line from the axis of rotation of the rotating member and is adjacent the rotating member;

means for displacing the reference location by an amount which corresponds to the desired angular increment between two adjacent index positions in a direction perpendicular to the radial line; and means for sensing the displacement of the reference location relative to a fixed location on the rotating member.

* * * * *